United States Patent

[11] 3,630,006

[72] Inventor Antonio A. Sandoval
 3744 Benton Blvd., Kansas City, Mo. 64128
[21] Appl. No. 874,122
[22] Filed Nov. 5, 1969
[45] Patented Dec. 28, 1971

[54] SPIRAL CAPILLARY GAS CHROMATOGRAPHIC COLUMN
 5 Claims, 5 Drawing Figs.
[52] U.S. Cl. .................................................. 55/386
[51] Int. Cl. ..................................................... B01d 15/08
[50] Field of Search ........................................... 55/67, 197, 386; 73/23.1

[56] References Cited
 UNITED STATES PATENTS
 3,149,941 9/1964 Barnitz et al. .................. 55/386
 3,245,207 4/1966 Wilson et al. .................. 55/197
 FOREIGN PATENTS
 636,078 2/1962 Canada ......................... 55/386

*Primary Examiner*—J. L. DeCesare
*Attorney*—Schmidt, Johnson, Hovey, Williams & Chase ABSTRACT: A capillary column for a gas chromatograph is presented by mutually cooperable surface portions of the complemental faces of a pair of separable members. At least one of the members has a pair of side-by-side grooves in the surface thereof whereby when the faces are disposed in interengagement the surface portions present a pair of groove capillary passages. One of the grooves serves as a separation groove while the other groove accommodates a reference standard. Inlet and outlet openings through one of the members communicate with opposite ends of the capillary passage and provides means for coupling the column with the inlet and outlet of a gas chromatograph. The reference groove provides a check for determining if any sample leaks from the separation groove and also greatly reduces the amount of leakage by equalizing the pressure on the separation groove. The members are easily disengaged to permit recoating of the partitioning material onto the grooved surface and can be quickly reassembled to present a fresh column.

PATENTED DEC 28 1971
3,630,006
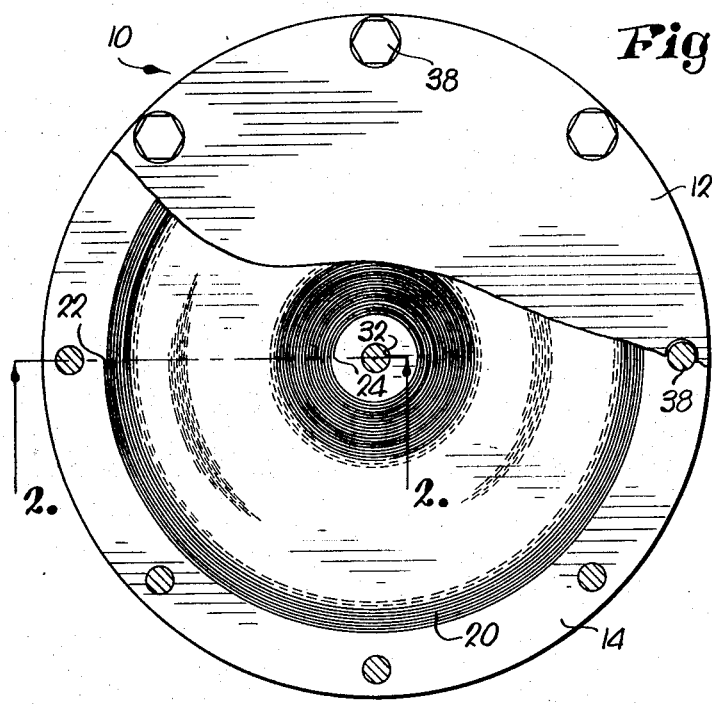
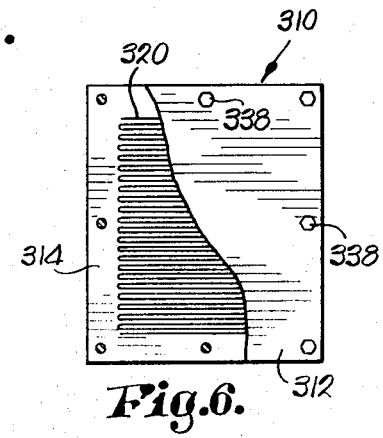
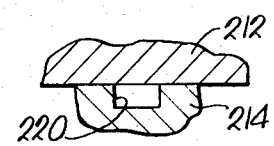
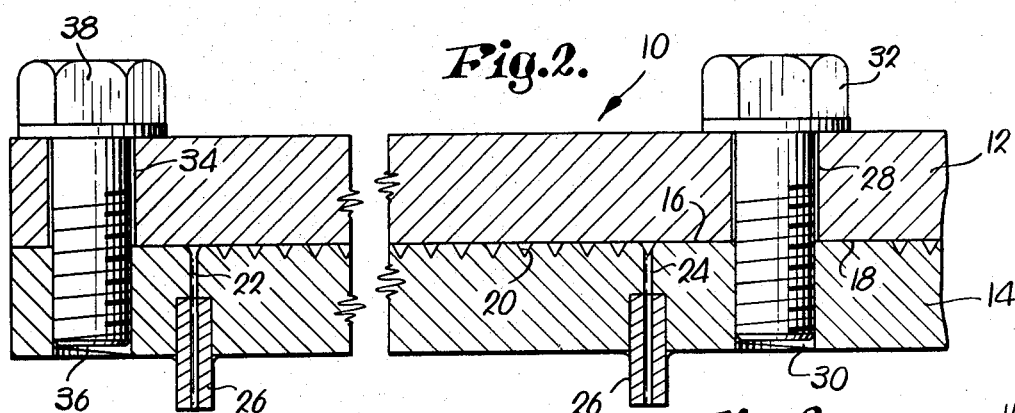
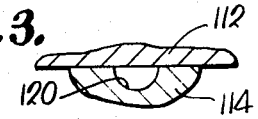
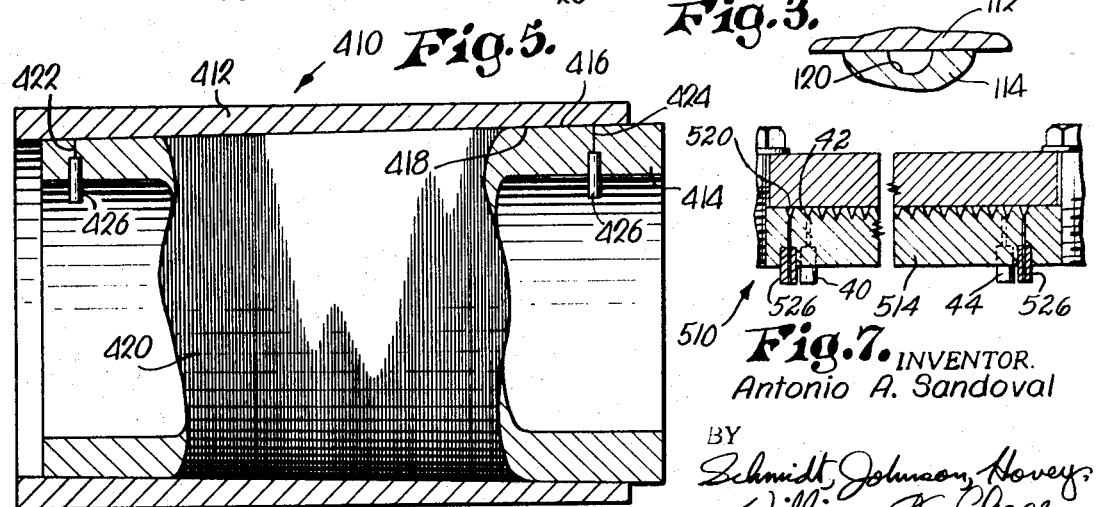
INVENTOR.
Antonio A. Sandoval
BY
Schmidt, Johnson, Hovey,
Williams & Chase.
ATTORNEYS.

SPIRAL CAPILLARY GAS CHROMATOGRAPHIC COLUMN

This invention relates to gas chromatographs and, more particularly, to a novel type of capillary chromatographic column.

A significant advancement in the field of chromatographic analysis was the introduction of so-called "capillary" or Golay columns. Such columns are of very small diameter and have a partitioning substance applied directly to the interior walls rather than being absorbed on an inert material with which the column is packed. Capillary columns provide improved separating capacity and greater resolution than with packed columns be avoiding the adverse effects of inhomogeneous packing and diffusion of the sample components in the stationary solid material. Also, since the flow resistance of a capillary column is less per unit length than with a packed column, greater column lengths are possible resulting in further advantages.

The main drawback to capillary columns has heretofore been their relatively high initial cost and short life. Attempts to recoat such columns after the partitioning substance has been exhausted have met with little success and have generally required frequent replacement of the columns.

The present invention overcomes the disadvantages of prior capillary columns by providing for a pair of separable members having cooperable surface portions in their complemental faces which define the capillary passage. The passage is presented by a groove in one of the surface portions which can be relatively inexpensively formed by a variety of techniques such as milling and etching. The members are also easily disengaged to permit recoating of the partitioning substance on the grooved surface after which they can be quickly and effectively reassembled.

It is, therefore, an object of the present invention to provide a capillary chromatographic column which can be relatively inexpensively formed by a variety of techniques such as milling and etching. The members are also easily disengaged to permit recoating of the partitioning substance on the grooved surface after which they can be quickly and effectively reassembled.

It is, therefore, an object of the present invention to provide a capillary chromatographic column which can be relatively inexpensively constructed using conventional techniques such as milling, etching, molding, and electroforming to provide a capillary groove in a base member.

Another important object of the invention is to provide a capillary chromatographic column which is constructed from a pair of mutually cooperable, separable members thus permitting a new partitioning substance to be applied quickly and efficiently by separating the members when necessary.

Still another object of the invention is to provide a capillary chromatographic column which, because of its compactness, makes greater column lengths practicable.

It is another object of this invention to provide a capillary chromatographic column which can be constructed from a pair of interengageable heat conductive plates of a relatively small size, thereby facilitating uniform heating of the column during the separating procedure.

As a further object of the invention, a capillary chromatographic column is provided which can be economically constructed in any one of a variety of column shapes for accommodation in a variety of different types of chromatographic machines.

A still further important object of the invention is to provide a capillary chromatographic column which can be constructed with any one of a variety of cross sections for facilitating the chromatographic separation of various materials.

Additionally, an object of the present invention is to provide a capillary chromatographic column which can be constructed relatively inexpensively with equal accuracy from any of a variety of starting materials, which materials can be selected with due regard for the reactivity of the substance being analyzed. Other objects of the invention will be made clear or become apparent from the following description and accompanying drawing, wherein:

FIG. 1 is a plan view partially in cross section and with major portions broken away illustrating one embodiment of the capillary chromatographic column;

FIG. 2 is a greatly enlarged, cross-sectional view taken alone line 2—2 of FIG. 1 with portions broken away for purposes of illustration and with details of the capillary passage being shown;

FIG. 3 is a greatly enlarged, fragmentary, cross-sectional view of an alternative configuration for the capillary passage;

FIG. 4 is a greatly enlarged, fragmentary, cross-sectional view of another alternative configuration of capillary passage:

FIG. 5 is a side elevational view of an alternative embodiment of the capillary column with major portions of the same being shown in cross section for purposes of illustration;

FIG. 6 is a plan view of a chromatographic column constructed according to the present invention illustrating an alternative column configuration, major portions of the cover plate being broken away for purposes of comprised partial cross-sectional view of an alternative form of the invention wherein a double-grooved plate provides a pair of side-by-side columns.

Referring to the drawing and initially to FIGS. 1 and 2, a capillary column adapted to be coupled with a material analyzing chromatograph is designated generally by the numeral 10. The column 10 is comprised of a pair of separable planar members such as annular plates 12 and 14. The plates 12 and 14 have opposed, essentially complemental faces which are provided with opposed, mutually cooperable surface portions 16 and 18 respectively. The surface portion 18 has a groove 20 therein of V-shaped cross section which follows a spiral path around the central axis of the plate 14. The surface portion 16 is continuous and uninterrupted whereby, when the faces of the plates 12 and 14 are disposed in interengagement, the surface portions 16 and 18 present a capillary passage of closed V-shaped cross section. The plate 14 has a first opening 22 which extends therethrough along a line normal to the surface portion 18, which communicates with one end of the capillary passage presented by the groove 20. A second opening 24 which also extends through the plate 14 and is normal to the surface portion 18, communicates with the other end of the passage presented by the groove 20. Each of the openings 22 and 24 has an enlarged bore at the end thereof opposite the surface portion 18 for receiving a nipple 26 which is secured to the plate 14 by a suitable weld or other appropriate means.

The annular plates 12 and 14 present a pair of openings 28 and 30 respectively which are aligned with the central axes of the plates. The opening 30 has a threaded bore which complementally receives a bolt 32. Similarly, each of the plates 12 and 14 is provided with a plurality of spaced, axially aligned apertures such as 34 and 36 in surrounding relationship to the spiral capillary passage. One of the apertures 36 of each aligned pair is provided with a threaded bore which complementally receives appropriate fastening means such as a bolt 38.

When the column 10 is utilized to effect separation of certain of the constituents of a material being analyzed, the plates 12 and 14 are separated to allow the groove 20 to be coated with an appropriate partitioning substance which is normally a relatively nonvolatile liquid phase. The partitioning liquid would, of course, be selected with due regard to the material being analyzed. The entire groove 20 is wetted with a solution of the liquid phase, excess solution is allowed to run off, and any volatile solvent is evaporated. The plates 12 and 14 are then placed with their faces in complemental engagement to present the capillary passage and the bolts 32 turned to bring the plates into sufficiently tight interengagement to preclude flow of the material being analyzed from one segment of the capillary passage to another along the area between the faces. The nipples 26 are then coupled with the inlet and outlet of a gas chromatograph and the material sample to be analyzed introduced into the capillary passage. It is to be understood, of course, that a gas chromatograph normally includes appropriate means for heating a column to maintain a gaseous phase therewithin, the temperature ranging between 20° C. and 250° C. depending upon the material being analyzed. Furthermore, any one of a variety of sensing mechanisms can be coupled with the outlet of the machine for detecting certain of the constituents of the material being analyzed after the same have been adequately separated by the column 10.

As illustrated in FIG. 3, a plate 114 has a groove 120 formed therein of semicircular cross section whereby when the uninterrupted planar surface portion of a plate 112 is disposed in interengagement with the surface portion of the plate 114, a capillary passage of closed semicircular cross section is formed.

Alternatively, as illustrated in FIG. 4, a plate 214 has a groove 220 of U-shaped cross section formed therein whereby, when the surface portion of a plate 212 is disposed in complemental engagement with the surface portion of the plate 214, a capillary passage of rectangular cross section is formed. The alternative cross-sectional configurations of the capillary passage as illustrated in FIGS. 2, 3 and 4 have been found to be advantageous in certain chromatographic separation procedures.

Referring additionally to FIG. 6, a further modification of the column 10 is shown and designated generally by the numeral 310. The column 310 is comprised of a pair of separable planar, rectangular plate members 312 and 314. The plate 314 has a groove 320 therein which follows a serpentine path along the face of the plate. Thus, when the plates 312 and 314 are disposed in complemental interengagement, a capillary passage of serpentine configuration is presented. A plurality of bolts 338 pass through appropriate openings in the plates 312 and 314 to hold the same in tight complemental engagement in the same manner as previously described for the plates 12 and 14. It is to be understood, of course, that the groove 320 could have a V-shaped cross section such as the groove 20, a semicircular cross section as the groove 114, a U-shaped cross section such as the groove 220, or any other appropriate cross-sectional configuration.

Referring additionally to FIG. 5 wherein an alternative embodiment of the column 10 is shown and designated generally by the numeral 410, the column 410 is comprised of a pair of separable members such as cylindrical bodies 412 and 414 which have opposed, essentially complemental faces presenting opposed, mutually cooperable complementally configured frustoconical surface portions 416 and 418. The bodies 412 and 414 are disposed one within the other in a tight interference fit and the body 414 has a groove 420 in the surface portion 418 which follows a continuous winding path around the face of the body. When the bodies 412 and 414 are forced into tight complemental engagement, the surface portions 416 and 418 present a capillary passage which follows a continuous winding path around the face of the body 414.

A pair of openings 422 and 424 in the body 414 communicate with the opposite ends of the passage presented by the groove 420. Each of the openings 422 and 424 has an enlarged bore at the end thereof opposite the groove 420 for receiving a nipple 426. The nipples 426 are, in turn, coupled with the inlet and outlet lines of a gas chromatograph.

The column 410 is used to effect separation of a material being analyzed on the chromatograph in generally the same manner as previously described for the column 10. The cylindrical bodies 412 and 414 are disengaged and a partitioning substance is placed on the walls of the groove 420 throughout the length thereof. The bodies 412 and 414 are then forced together in a tight interference fit and the nipples 426 coupled to the inlet and outlet of the chromatograph. As with the column 10, any one of a variety of detectors can be used in combination with the outlet of the chromatograph and appropriate heating means is normally a part of the apparatus for maintaining a gaseous phase.

It is to be understood of course, that with any of the columns 10, 310 and 410 described above, the respective capillary passages which are formed by a groove in one of the separable members must be of a length sufficient to permit effective separation of certain of the constituents of the material being analyzed to an extent adequate to permit such analysis. The necessary length of the capillary column will vary considerably with the material being analyzed and the partitioning agent being used, but in general, a length in the range of 50 to 100 meters is adequate for most chromatographic analyses. The width of the groove forming the capillary column can also be varied considerably, a range of from 0.1 to 2.0 mm. generally being adequate. With a groove diameter of 1.0 mm. and a distance between turns (center to center) of 2.0 mm., a column 62.79 meters in length can be provided in a spiral pattern on a plate such as 14 if the first turn has a radius of approximately 2.5 cm. and the last turn has a radius of 20 cm. With the diameter of the groove reduced to 0.15 mm. and with a distance between turns of 0.3 mm., a column 415.49 meters in length can be provided in the spiral pattern on a plate 14 is the first turn of the spiral groove has a radius 2.5 cm. and the last turn has a radius of 20 cm. The annular plate arrangement shown in FIGS. 1 and 2 of the drawing has been found to be the preferred configuration for constructing a capillary column since the spiral configuration of the capillary passage provides maximum utilization of the available surface area and the annular configuration of the plates with fastening means disposed around the edge thereof and through the center provides for very effective sealing of the two separable plate members. Furthermore, the nonlinear compact arrangement of the column 10 is extremely well adapted for efficient and uniform heating.

With the column 410, when the inner cylindrical member 414 has an average outside diameter along its length of 15.24 cm., and a length of approximately 10 cm., a groove of 1 mm. diameter with successive grooves (center to center) spaced 2 mm. apart results in a column 24.09 meters in length. A cylindrical member 414 of the same length and outside diameter can present a column 160.60 meters in length by reducing the diameter of the groove to 0.15 mm. and the groove spacing between turns (center to center) to 0.3 mm.

It should be emphasized that a number of materials, as for example, copper, aluminum, glass, plastic, nylon, nickel and stainless steel can be used as starting materials for forming any of the columns described above. The starting material is normally selected with due regard for the chemical reactivity of the substance being analyzed and the properties of the partitioning agent being used. It will also be appreciated that various conventional techniques, including milling, molding, etching and electroforming can be used to form the appropriate groove, with the particular process being chosen with due regard for the starting material and the groove configuration and cross section desired.

In most instances, the respective surface portions of the two separable members which form the capillary column are highly machined to assure a tight complemental fit which will preclude the flow of material being analyzed from one segment of the column to another between the opposed faces. It may be desirable to include a sealing gasket between the opposed faces of the two separable members such as the plates 12 and 14 to insure leak-free operation. The gasket would preferably be constructed from a relatively soft malleable metal such as tin, copper or gold, or a synthetic material such as Teflon or nylon.

Instead of providing a single continuous, nonlinear groove in the face of the grooved plate, it may be desirable in certain instances to provide double, triple or multiple, side-by-side continuous, nonlinear grooves, only on of which is brought into direct communication with the inlet and outlet of the chromatograph. In this manner, if a double-grooved plate such as 514 is provided, an inert gas (which normally would be the carrier for the sample) may be passed via inlet nipple 40 through the groove 42 which is not connected to the chromatograph to sweep out of the column 510 and past outlet nipple 44 any sample which may leak out of the separation groove 520. The separation groove 520 is coupled with chromatograph through inlet and outlet presented by nipples 526 as previously described with reference to FIGS. 1–6. By including a standard in the sample in accordance with conventional analytical techniques, the amount of material which leaks from the main separation groove 520 may be readily ascertained and the results obtained from the chromatographic analysis modified accordingly.

The pressure of the carrier gas passed through the sample clearance groove may be at least equal to or greater than the pressure of the sample in the separation groove to virtually if not completely eliminate leakage of sample therefrom, but if desired, a triple-groove configuration may be employed with sample clearance grooves thereby presented on both sides of each portion of the sample groove throughout its length thereof.

In order to remove the partitioning agent from the sample clearance groove or grooves prior to use of the column, this may readily be done by passing a solvent for such agent through the sample clearance grooves.

The partitioning agent may also be applied to only the separation groove portion of the grooved plate if desired by using conventional equipment and techniques for injecting a required amount of the partitioning liquid into the groove as the liquid ejection is moved therealong and in a manner to prevent such partitioning liquid from contacting the plate area between grooves or nonseparation grooves. Then when the cover plate is placed over the grooved plate and the assembly agitated, all surfaces defining a part of the capillary column will be coated. However, frequently this is not necessary because generally sufficient contact area is provided by simply substantially filling the separation groove with the partitioning solution and simply allowing the solvent to evaporate before the cover plate is positioned over the grooved plate. In this case, only the small surface areas of the cover overlying the separation groove are not coated with the partitioning agent.

It is also contemplated that any of the columns described above could be modified to present double or triple side-by-side columns for the simultaneous analysis of more than one material or for a given material and its carrier gas. If desired, different partitioning agents may be placed in different continuous grooves for confirmation analyses or for more efficient utilization of the test equipment.

While particular reference has been made to a gas chromatograph utilizing a liquid partitioning agent, it is to be understood that the material being analyzed does not have to exist naturally in the gaseous state since vaporization can be achieved within the column by appropriate heating. While the partitioning agent has been particularly referred to as a nonvolatile liquid, it is contemplated that solid partitioning agents such as silica gel can be used with the apparatus of the present invention. Regardless of the physical characteristics of the partitioning agent, it is readily apparent that definite advantages are to be achieved with a capillary column constructed according to the teachings of the present invention. Particularly, such a column can be quickly and economically recoated with a partitioning agent to give it an indefinite life and permit a single column to be utilized for analyzing a wide variety of materials.

Having thus described the invention, what is claimed as new and desired to be secured by Letters Patent is:

1. A capillary column adapted to be coupled between the inlet and outlet openings of a material-analyzing chromatograph, said column comprising:

a pair of separable members provided with opposed, essentially complementary faces, said faces being provided with opposed, mutually cooperable surface portions defining first and second side-by-side, continuous, coextending, nonlinear capillary passages therebetween, said first passage presenting a separation groove of a length sufficient to permit effective separation therewithin of certain of the constituents of said material to an extent adequate to permit analysis thereof, said first passage being provided with inlet-presenting means for communicating the separation groove with the inlet of the chromatograph and outlet-presenting means for communicating the separation groove with the outlet of the chromatograph, said second passage presenting a sample clearance groove for receiving an inert gas during separation of said constituents in the separation groove, said second passage being provided with inlet-presenting means and outlet-presenting means, and said faces being disposed in sufficiently tight complemental interengagement to substantially preclude flow of said material being analyzed from said separation groove into said clearance groove.

2. A capillary column as set forth in claim 1, wherein said separation groove and said sample clearance groove are each presented by a recessed portion of one of said members, the other of said members having a continuous uninterrupted surface in opposed relationship to said recessed portion for closing said grooves.

3. A capillary column as set forth in claim 1, wherein each of said passages follows a spiral path around the face of said one member with said passages in closely spaced relationship and with said sample clearance groove having its outermost convolution spaced outwardly from the outermost convolution of said separation groove whereby the latter is bounded on opposite sides through out its length by said sample clearance groove.

4. A capillary column as set forth in claim 1, wherein said members are planar, at least one of the surface portions having a groove therein whereby when said faces are disposed in interengagement said surface portions present said capillary passage; and a plurality of fastening means disposed in surrounding relationship to said passage for bringing said faces into tight complemental interengagement.

5. A capillary column as set forth in claim 1, wherein said members comprise a pair of generally cylindrical bodies disposed one within the other in a tight interference fit, at least one of said surface portions having a groove therein whereby when said faces are disposed in interengagement said surface portions present said capillary passage.

* * * * *